(12) United States Patent
Sarlioglu et al.

(10) Patent No.: US 7,193,383 B2
(45) Date of Patent: Mar. 20, 2007

(54) ENHANCED FLOATING REFERENCE FRAME CONTROLLER FOR SENSORLESS CONTROL OF SYNCHRONOUS MACHINES

(75) Inventors: Bulent Sarlioglu, Torrance, CA (US); Colin E. Huggett, Longmont, CO (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/174,550

(22) Filed: Jul. 6, 2005

(65) Prior Publication Data
US 2007/0007922 A1    Jan. 11, 2007

(51) Int. Cl.
G05F 1/70 (2006.01)

(52) U.S. Cl. .................. 318/438; 318/799; 318/801; 318/803

(58) Field of Classification Search ........... 318/438, 318/799, 801, 803, 254, 138, 434, 700; 702/38; 363/132
See application file for complete search history.

(56) References Cited

U.S. PATENT DOCUMENTS

| 4,310,878 | A | 1/1982 | Hyatt |
| 5,982,120 | A | 11/1999 | Akiyama et al. |
| 6,281,656 | B1 | 8/2001 | Masaki et al. |
| 6,301,136 | B1 | 10/2001 | Huggett et al. |
| 6,344,725 | B2 | 2/2002 | Kaitani et al. |
| 6,414,462 | B2 | 7/2002 | Chong |
| 6,738,718 | B2 * | 5/2004 | Kurnia et al. ............ 702/41 |
| 2004/0007995 | A1 * | 1/2004 | Fu .......................... 318/254 |
| 2004/0021447 | A1 | 2/2004 | Kalman et al. |
| 2005/0063205 | A1 * | 3/2005 | Stancu et al. ............ 363/132 |

* cited by examiner

Primary Examiner—Karen Masih
(74) Attorney, Agent, or Firm—Oral Caglar, Esq.

(57) ABSTRACT

A method and system for controlling a power converter coupled to a polyphase power line. The method includes measuring at least two motor phase currents, obtaining a floating reference frame for the current Park vector, adjusting the reference frame based on an estimated rotor speed, and controlling the power converter via the floating reference frame to reinitiate power to a motor while a rotor is still moving.

20 Claims, 7 Drawing Sheets

ENHANCED FLOATING REFERENCE FRAME CONTROLLER FOR SENSORLESS CONTROL OF SYNCHRONOUS MACHINES

REFERENCE TO RELATED APPLICATIONS

Related subject matter is disclosed in U.S. Pat. No. 6,301,136, issued on Oct. 9, 2001, entitled "Floating Frame Controller", and U.S. Patent Application Publication No. 2004/0021447, entitled "Voltage Control Of An HR-PMG Without A Rotor Position Sensor", the entire contents of which is incorporated herein by reference.

BACKGROUND OF THE INVENTION

1. Field of the Invention

The invention relates to a method and apparatus for performing electrical power conversion. More particularly, the present invention relates to a method and apparatus for resynchronizing a power converter such as an inverter without using a rotor position sensor.

2. Description of the Related Art

A conventional synchronous motor typically uses rotor position sensors to provide information regarding the position of the motor's rotor with respect to the motor's stator windings to achieve control of the speed and torque. Rotor position sensors such as Hall effect devices are typically mounted in the stator, proximate the stator windings. The rotor position sensors provide rotor position information, which allows for proper control of the conversion of power that is supplied to the stator windings.

However, rotor position sensors can be unreliable due to mechanical alignment problems (e.g., problems caused by bearings) and temperature incompatibility problems between the stator windings and electronic components such as the Hall effect devices. Moreover, the rotor position sensors can be difficult to mount to the motor during motor assembly, especially for multi-pole motors. In multi-pole motors, the electrical misalignment angle is equivalent to the angular mechanical misalignment angle multiplied by the number of pairs of poles. Eliminating the rotor position sensor and its associated interface circuitry and cable to the controller can lower the weight of the overall system, but also increase the robustness of such systems, which is very desirable in aerospace applications where the size and weight and reliability are premium characteristics of the systems offered.

In response to the problems with rotor sensors, sensorless control techniques have been developed for synchronous machines. Sensorless control techniques allow the control of the machine without the use of physical rotor sensors.

In such a sensorless control system, if there is a power interrupt to the controller, the synchronization with the synchronous motor can be lost. When the power comes back on and the rotor is still spinning, if the inverter were to try to synchronize with the synchronous machine to initiate the drive, a current value exceeding the rated current can flow through the synchronous machine causing trauma to the electronic components of the controller. For example, power semiconductor switches such as IGBTs can be damaged. Without any resynchronization scheme the stopping time of the rotor can vary due to the inertia of the system. For example, for large drives this can take tens of seconds. Therefore, it would require long waiting times to be introduced to the controller's logic for a restart. Thus, conventional sensorless control techniques would have to wait for the synchronous machine to come to a full stop before start-up of the drive can begin. This can be quite important, for example, in critical drive systems in aerospace applications. For example, an electrical drive system should engage in the shortest amount of time possible to achieve resynchronization without waiting for the rotor to come to a full stop.

Thus, there is a need for a sensorless control drive technique without using a rotor position sensor that does not have to wait for the synchronous machine to come to a full stop before synchronizing with the synchronous machine in order to initiate the drive. This will allow for a controlled re-initiation of torque for motoring and power for a generating mode of operation.

SUMMARY OF THE INVENTION

An object of the present invention is to provide a sensorless control scheme and algorithm that allows resynchronization of the synchronous machine after a power interrupt for both motoring and generation mode of operations.

Still another object of the present invention is to provide an adjustable power factor for sensorless control that allows the angle between the machine voltage and current Park vectors to be adjusted.

These and other objects are substantially achieved by providing a method and system employing a power converter that interfaces the polyphase synchronous machine and a DC distribution system. The method includes measuring line currents and back emf, selecting a floating reference frame for the current Park vector, adjusting the reference frame based on an estimated rotor speed, and controlling the power converter via the floating reference frame to reinitiate power to a motor or a generator while a rotor is still moving.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

The embodiment of the invention described below includes a system and method for reinitiating power without inducing adverse effects to a power converter and electrical machine while the rotor is still moving.

Figure 1:
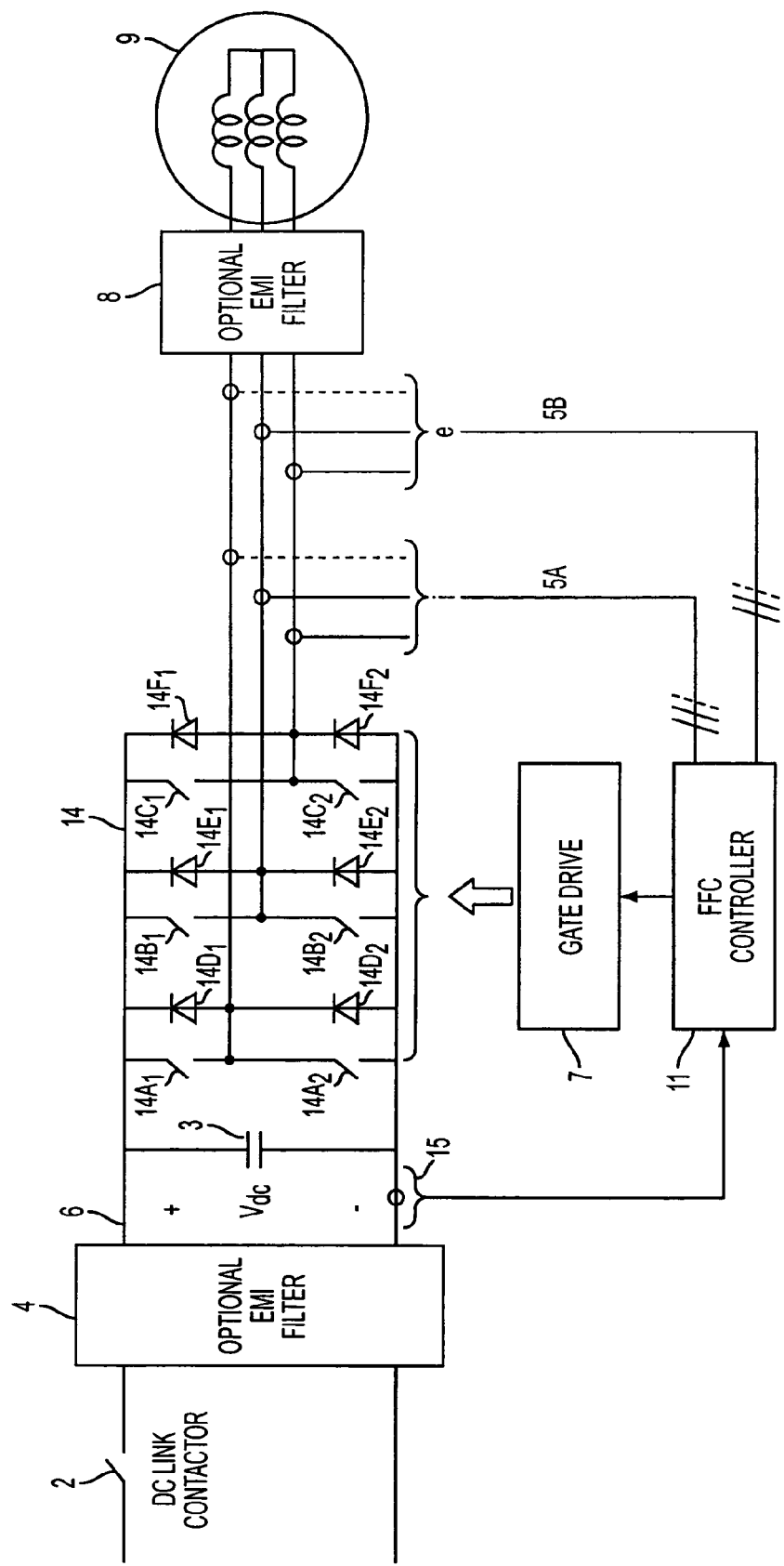
FIG. 1 is a block diagram of a power converter in accordance with an embodiment of the present invention.

FIG. 1 is a block diagram of a power converter in accordance with an embodiment of the present invention. FIG. 1 comprises a DC current sensor 15, a DC link contactor 2, a first filter 4, a DC link 6, a capacitor 3, an inverter 14, a second filter 8, an electrical motor 9, a gate drive 7, the floating frame controller 11, and AC current and voltage sensors 5. The DC link 6 provides the low source impedance for the inverter 14, and is used to synthesize a pulse width modulated AC output voltage using the inverter 14. The inverter 14 may be a three-phase bridge inverter. Such an inverter includes six switches: a set of upper switches and a set of lower switches. Each switch of the inverter includes a controllable solid-state device (e.g., an IGBT, a MOSFET) and an anti parallel diode 14D, 14E, and 14F across the solid-state device 14A, 14B, and 14C. It should be noted that diodes 14D, 14E and 14F can be a part of the semiconductor switches 14A, 14B, and 14C. The gate drive 7 provides gate signals which control the six IGBT switches or MOSFETS in the inverter 14. First filter 4 and second filter 8 are optional filters such as Electromagnetic Interference (EMI) filters and can provide differential and common mode attenuation for Electromagnetic Compatibility (EMC) compliance. It should be noted that if shielded cable between the inverter and the synchronous machine is used, second filter 8 may not be needed. The electrical machine 9 can be a synchronous machine such as a permanent magnet (PM) synchronous machine. The dc link capacitor 3 is coupled across the DC link 6 to provide a low source impedance for the inverter 14, and to reduce voltage ripple on the DC link 6, for example by smoothing the DC voltage. The DC link contactor 2 serves to open or close the DC link 6 from the main dc power distribution system.

At least two AC current and three AC voltage sensors 5 are used to measure two phase currents and two terminal voltages of the electrical motor 9. The measured values are input to the FFC 10. If only two phase currents are measured, the third phase current is calculated by using the two measured currents assuming that the neutral of the stator windings is not galvanically tied to any point in the inverter, that is $i_c=-(i_a+i_b)$. It should be noted that the voltage sensors will only sense the so called back emf of the synchronous machine when the inverter is non operational. Details of the controller block diagram will be provided in FIG. 2 for motoring and FIG. 3 for generation mode of operations. Next, a current and a voltage Park vector in the stationary reference frame are formed using the measured current signals.

Figure 2:
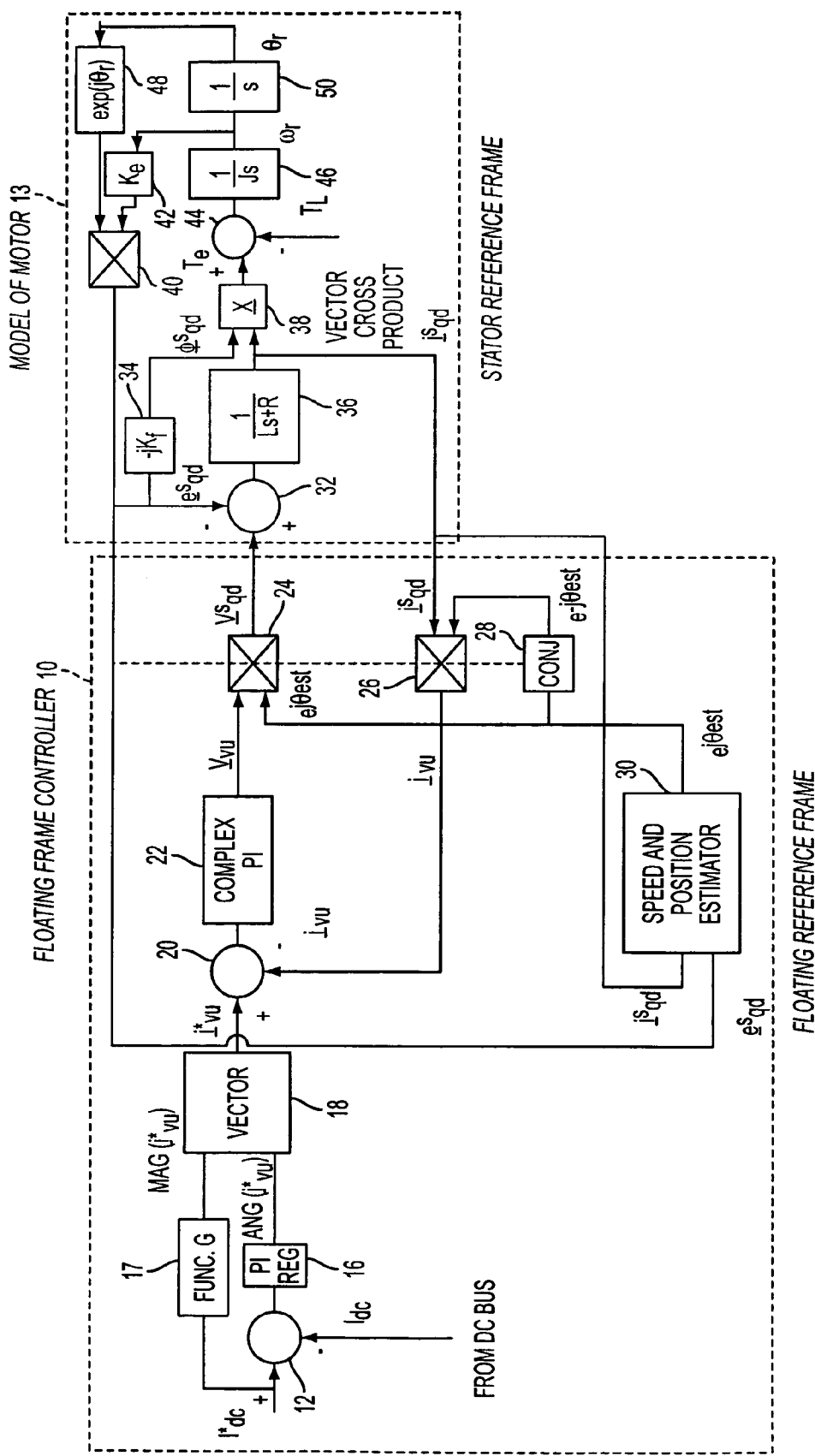
FIG. 2 is a block diagram illustrating an example of a floating frame controller system related to motoring in accordance with an embodiment of the present invention.

FIG. 2 is a block diagram illustrating an example of a floating frame controller system block diagram 10 and electrical machine model block diagram 13 for a motoring operation in accordance with an embodiment of the present invention. The floating frame controller (FFC) system block diagram 10 comprises an adder 12, function generator 17, a proportional integrator (PI) regulator 16, a vector block 18, a complex adder 20, a complex PI 22, a multiplier 24, a multiplier 26, a conjugate block 28 and a speed and position estimator 30. The electrical machine block diagram comprises an adder 32, complex gain constant block 34, delay block 36, vector cross-product 38, multiplier block 40, gain constant block 42, adder 44, integrator 46, exponent block 48, and integrator 50. The Floating Frame Controller (FFC) 10 reinitiates power to the synchronous motor without inducing any trauma while the rotor is still moving. This eliminates the delay of having to wait until the rotors of the synchronous motor come to a complete stop before reinitiating power.

Figure 3:
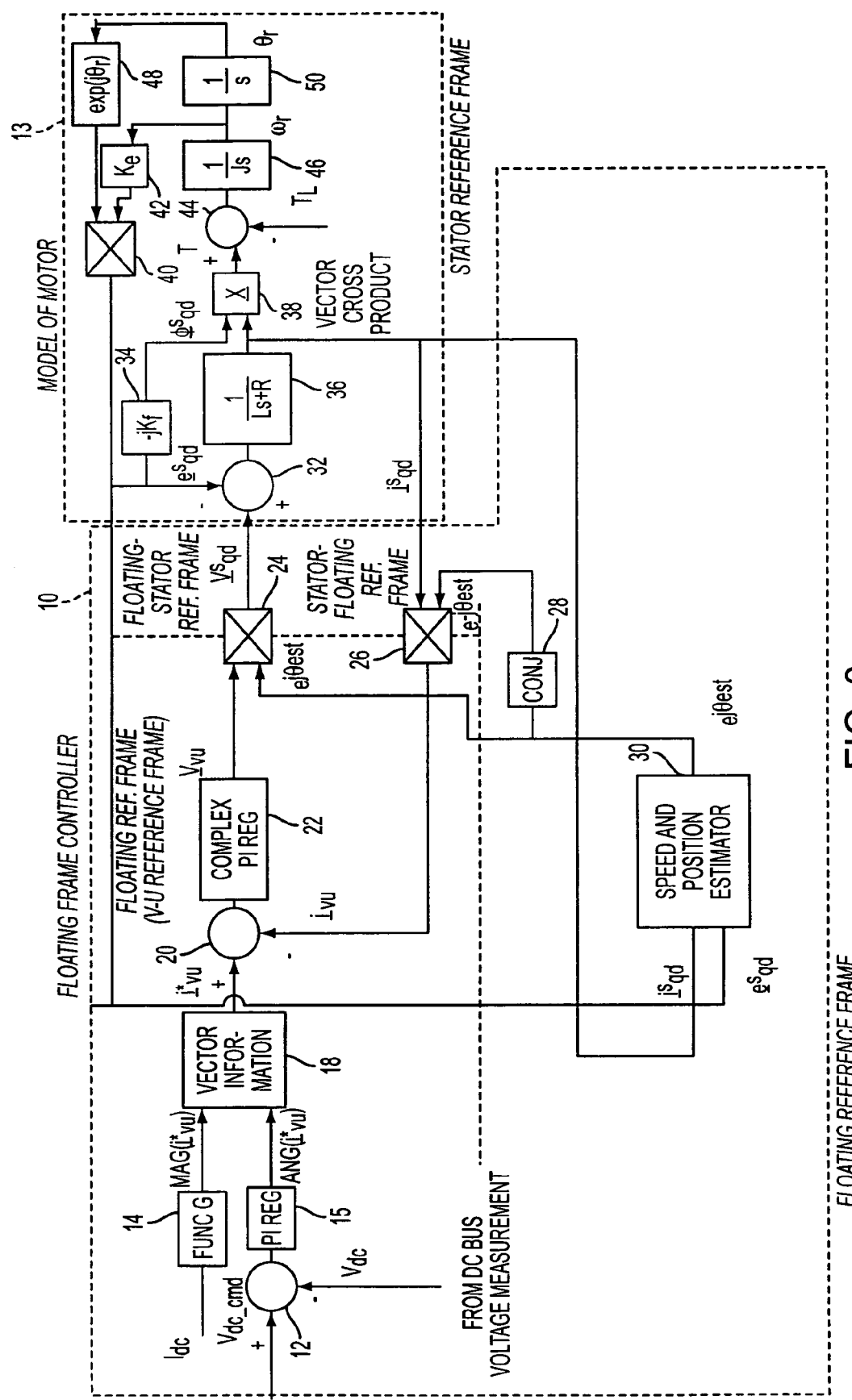
FIG. 3 is a block diagram illustrating another example of a floating frame controller system related to generation in accordance with an embodiment of the present invention.

FIG. 3 is a block diagram illustrating an example of a floating frame controller system block diagram 10 and electrical machine model block diagram 13 for a generator operation in accordance with an embodiment of the present invention. The FFC system block diagram 10 comprises an adder 12, function generator 14, a proportional integrator (PI) regulator 15, a vector block 18, a complex adder 20, a complex PI 22, a multiplier 24, a multiplier 26, a conjugate block 28 and a speed and position estimator 30. The electrical machine block diagram comprises an adder 32, complex gain constant block 34, delay block 36, vector cross-product 38, multiplier block 40, gain constant block 42, adder 44, integrator 46, exponent block 48, and integrator 50. The FFC 10 reinitiates power to the synchronous generator without inducing any damage while the rotor is still moving. This eliminates the delay of having to wait until the rotors of the synchronous motor come to a complete stop before reinitiating power.

During operation of the synchronous motor control system 10, the inverter (not shown) converts the dc power to three-phase ac power using a pulse width modulation techniques such as space vector modulation and supplies via a power line (not shown) currents to all three stator windings of the machine 10. These currents flow through the windings and create a rotating magnetic field.

An embodiment of the present invention uses Park vectors to go from a stationary to a non-stationary reference frame. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984) which is incorporated herein in its entirety.

Because of the spatial relationship of the stator windings and the temporal relationship of the phase currents, the Park vector representing the phase currents may be represented by a two-dimensional complex number (provided that the neutral of the stator windings is not galvanically tied to any point in the inverter 14). Similarly, voltages and airgap flux can be represented by their own voltage and flux Park vectors.

The rotating magnetic field interacts with main field flux provided by the permanent magnets in rotor, resulting in a torque. The torque is constant if the permanent magnet flux Park vector and the current Park vector are maintained at a constant angle relative to one another and the amplitude of the current Park vector and the flux vector are constant. Maximum torque occurs at a ninety degree angle and minimum torque occurs at a zero degree angle, the angle being measured between the two Park vectors.

If a rotor reference frame (that is a reference frame that coincides with the magnetic axis of the rotor) is known, the current Park vector can be converted from a stationary reference frame to a synchronous reference frame with respect to the rotor. As a result of this transformation, AC quantities measured in the stationary reference frame are converted to equivalent DC quantities in steady state in the so called q-d reference frame.

Referring to FIG. 2, the motor 13 represents a permanent magnet motor in the stationary reference frame. Specifically, the motor 13 is represented in mathematical form. That is, the adder 32 subtracts the back emf Park vector $\underline{e}^s_{qd}$ from the terminal voltage Park vector $\underline{v}^s_{qd}$. The output of the adder 32 is provided to the first order delay block 36, which represents the machine synchronous inductance and resistance. The output of the delay block 36 is the current Park vector $\underline{i}^s_{qd}$. The vector cross-product multiplier 38 receives the flux Park vector $\underline{\phi}^s_{qd}$ and the current Park vector $\underline{i}^s_{qd}$ and performs a vector cross product to provide airgap torque $T_e$. Adder 44 subtracts the load torque TL from the airgap torque $T_e$. The output of the adder 44 is provided to integrator 46. That is, $$\frac{1}{Js}$$

is representative of the inertia of the system. The output of block 46 is the speed of the rotor $\omega_r$. Another integrator 50 is used to obtain the rotor angle $\theta_r$. The exponent block 48 provides a rotating unit vector in synchronous with the rotor position. Back EMF Park vector $\underline{e}^s_{qd}$ is obtained by multiplying the $e^{j\theta_r}$ and $K_e \omega_r$ (output of Block 42). The flux Park vector $\underline{\phi}^s_{qd}$ is obtained by rotating the back emf vector by −90 degrees and rescaling. This is done at Block 34.

Figure 4:
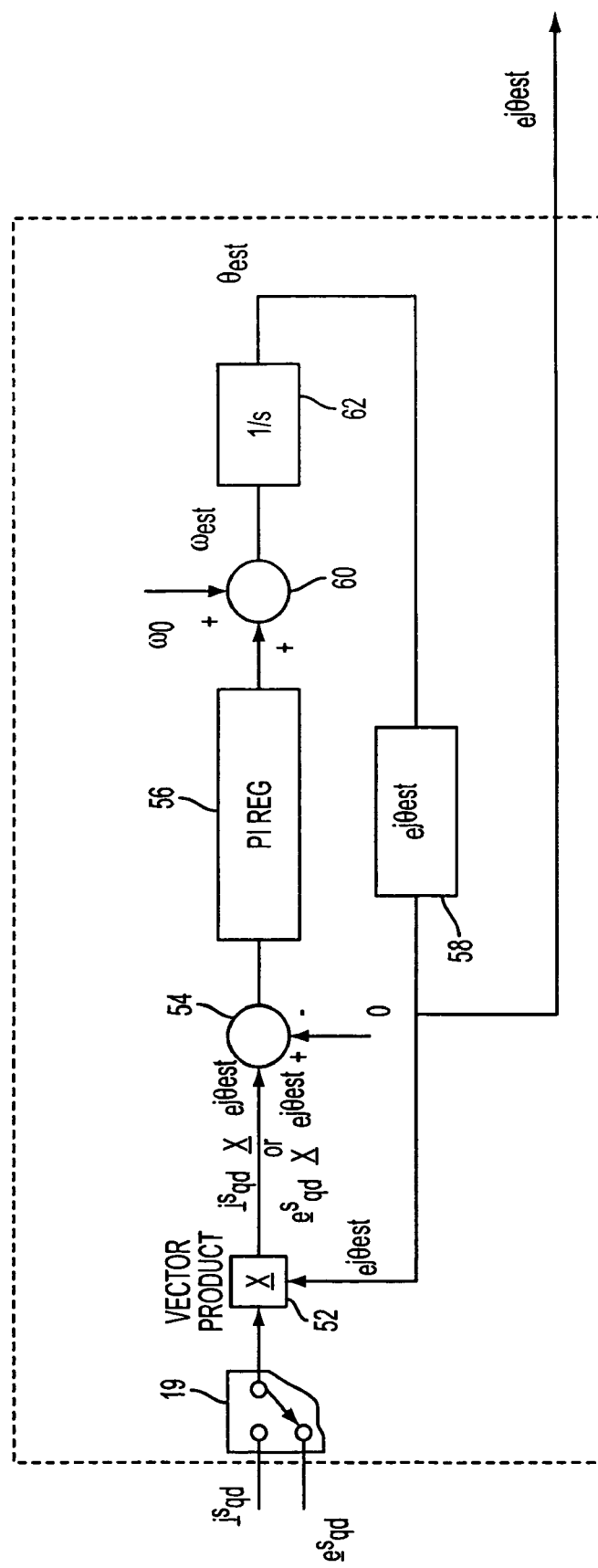
FIG. 4 is a block diagram illustrating an example of a circuit using vector components to estimate current vector position and angular speed to achieve sensorless control in accordance with an embodiment of the present invention.
Figure 5:
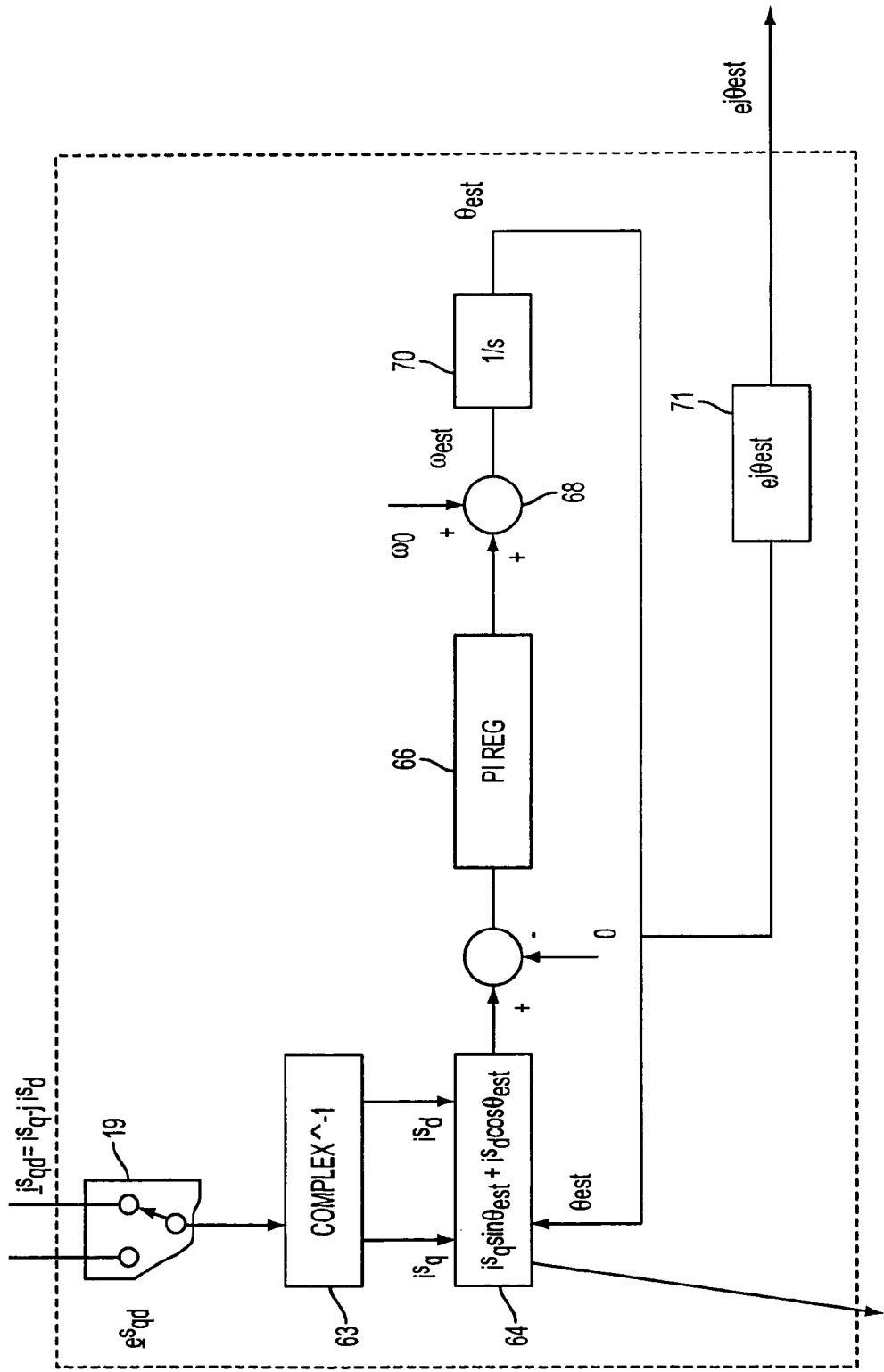
FIG. 5 is a block diagram illustrating an example of a circuit using q-d components to estimate current vector position and angular speed to achieve sensorless control in accordance with an embodiment of the present invention.

With reference to the FFC 10 of FIG. 2, the current Park vector $\underline{i}^s_{qd}$ is provided to the speed and position estimator 30 and to the multiplier 26. The speed and position estimator 30 processes the current Park vector $\underline{i}^s_{qd}$ and estimates the speed and angle of the current Park vector $\underline{i}^s_{qd}$ and generates a reference frame $e^{j\theta_{est}}$ based on the speed and angle of the current vector $\underline{i}^s_{qd}$. FIGS. 4 and 5, which will be described in detail below, illustrate examples of the estimation of the speed and angle of the current vector $\underline{i}^s_{qd}$.

The speed and position estimator provides the floating reference frame $e^{j\theta_{est}}$ to the conjugate block 28 and to the multiplier 24. The reference frame is synchronous with the rotor, but is rotated from the traditional axes used in the previously described q-d transformation, since the reference frame is aligned with the current vector as measured by the current sensors. The conjugate block 28 conjugates the reference frame $e^{j\theta_{est}}$ and provides a conjugated reference frame $e^{-j\theta_{est}}$ to the multiplier 26. The multiplier 26 processes the current vector $\underline{i}^s_{qd}$ in a stationary reference frame and conjugated reference frame $e^{-j\theta_{est}}$ and outputs the current Park vector $\underline{i}_{vu}$ in floating synchronous reference frame.

A reference DC current $I^*_{dc}$ signal is provided to adder 12 and to a function generator 14. The adder 12 subtracts the DC current signal $I^*_{dc}$ and compares it to a DC current feedback signal $I_{dc}$. The output of the adder 12 is provided to the proportional integrator type regulator 16. The proportional integrator type regulator 16 provides an output "Angle", which is an angle command of the AC current Park vector in floating synchronous reference frame. The Angle is a dynamic command as a function of loading of the machine. The proportional integrator type regulator 16 causes the reference frame to move from its existing position to another position relative to the traditional q-d reference frame. In doing this, the amount of power output from the machine is also changed. The angle is referenced to the existing floating synchronous reference frame. So when the angle needs to be changed because either too little or too much torque is being produced, the reference frame is moved. Thus, the angle is a direction in which to move the reference frame as it relates to the q-d axis.

The function generator 17 provides an output "Magnitude" which is the magnitude of the AC current Park vector. The Magnitude and Angle are provided to the vector block 18. The Magnitude is used to provide AC commanded value for the current Park vector $\underline{i}_{vu}$ in floating synchronous reference frame. It should be noted that the terminal voltage is not in phase with the current. That is, power factor can be adjusted by changing the commanded Angle and Magnitude of the commanded current vector $\underline{i}^*_{vu}$. This allows the minimizing of losses for the machine so that the torque per square watt that is produced is maximized, for example.

At the adder 20, the commanded current vector $\underline{i}^*_{vu}$ is compared to the current feedback vector $\underline{i}_{vu}$ both in floating reference frame. The output of the adder 20 is provided to complex proportional integrator 22 where a voltage vector $\underline{v}_{vu}$ is output. At the multiplier 24, the voltage vector $\underline{v}_{vu}$ and the unit vector $e^{j\theta_{est}}$ are multiplied. The resultant voltage vector $\underline{v}^s_{qd}$ is converted from the floating reference frame to a stationary reference frame and provided to the adder 32 of the motor 13.

FIG. 3 is a block diagram illustrating an example of a floating frame controller system block diagram 10 and electrical machine model block diagram 13 for a generator operation in accordance with an embodiment of the present invention. The synchronous machine 9 is driven by a prime mover. The generation operation is achieved via power transfer from the prime mover to the synchronous generator and then to the dc bus loads using the inverter 14. Particularly, the power transfer is achieved by controlling the current Park vector with respect to the terminal voltage Park vector. An additional requirement is typically to regulate a constant dc voltage value that is to be supplied to the loads connected to the dc bus. Typically, the dc link voltage needs to be regulated to achieve dc constant dc link voltage. This is needed as the load transients can cause significant transients and oscillations for the dc link voltage if the control of the system does not have enough bandwidth The magnitude of the commanded current Park vector $\underline{i}^*_{vu}$ in floating reference frame is obtained via a function generator 14 whose input is the measured dc link current $I_{dc}$. The dc link voltage $V_{dc}$ is measured and compared to the commanded dc link voltage $V_{dc\_cmd}$ at adder 12. The output of the adder 12 is provided to a proportional integrator regulator 15 where the angle of the current Park vector at floating reference frame Ang($\underline{i}^*_{vu}$) is the output. At steady state the angle of the current Park vector at floating reference frame is zero, because the reference frame is aligned with the current Park vector at floating reference frame.

FIG. 4 is a block diagram illustrating an example of a circuit using vector components to estimate position and angular speed of the current Park vector in accordance with an embodiment of the present invention. For example, FIG. 4 takes $\underline{i}^s_{qd}$ and outputs unit vector $e^{j\theta_{est}}$ in vector domain. FIG. 5 is a block diagram illustrating an example of a circuit using q-d components in stationary reference frame to estimate position and angular speed of the current Park vector in accordance with an embodiment of the present invention. The circuits of FIG. 4 and FIG. 5 perform the same function of allowing the transition from a stationary to nonstationary reference frame. However, FIG. 4 uses Park vectors while FIG. 5 uses q-d components in stationary reference frame.

Both the circuits of FIG. 4 and FIG. 5 use only two (or three) phase currents of the synchronous machine to determine the speed of the rotation and position of the stationary current Park vector. In addition, a switch 19 is used to transition from the back emf park vector to the current vector during resynchronization.

Figure 6:
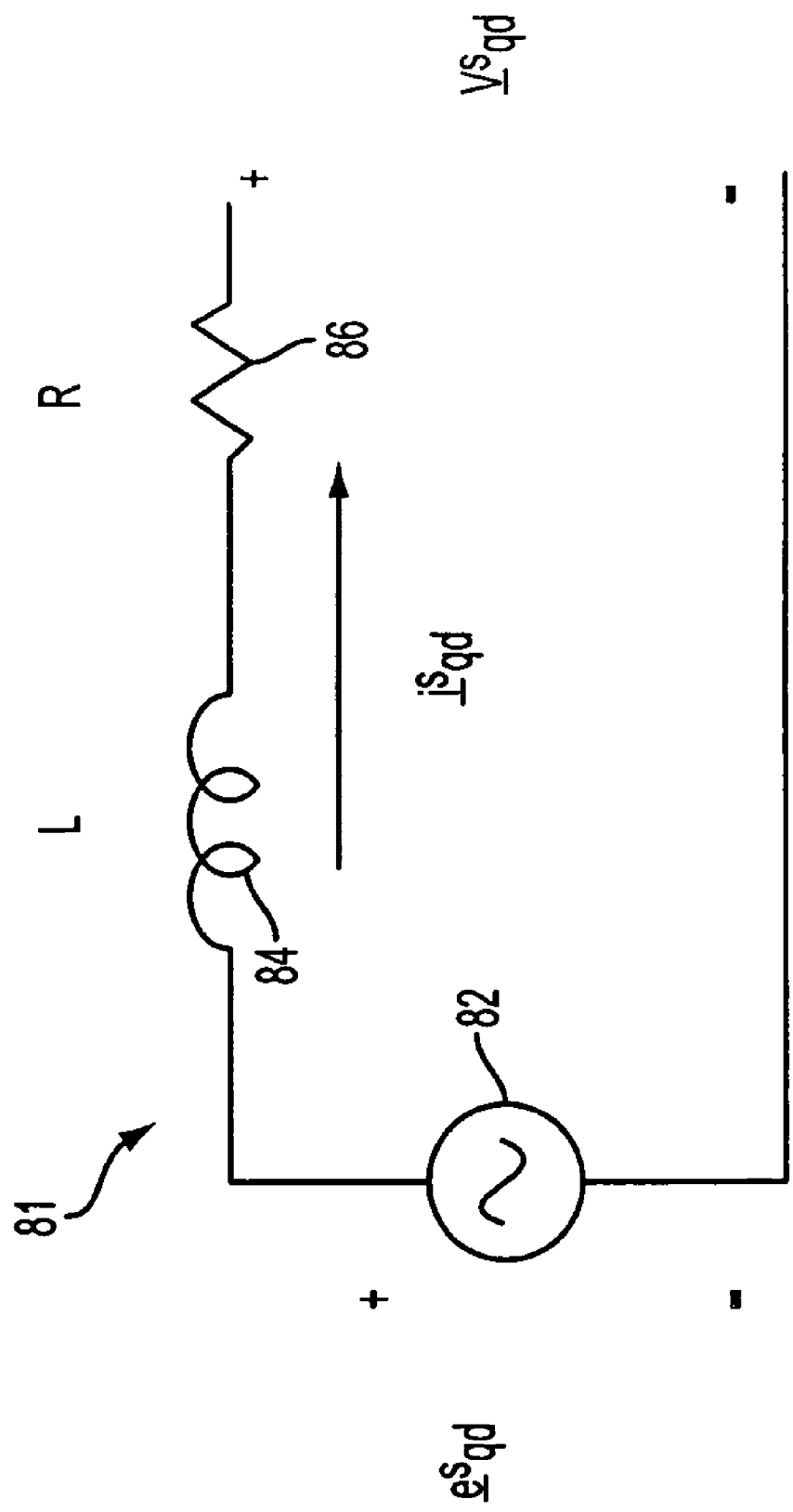
FIG. 6 is a circuit diagram illustrating an example of a permanent magnet synchronous machine in accordance with an embodiment of the present invention.

FIG. 6 shows the equivalent circuit of a synchronous machine.

Figure 7:
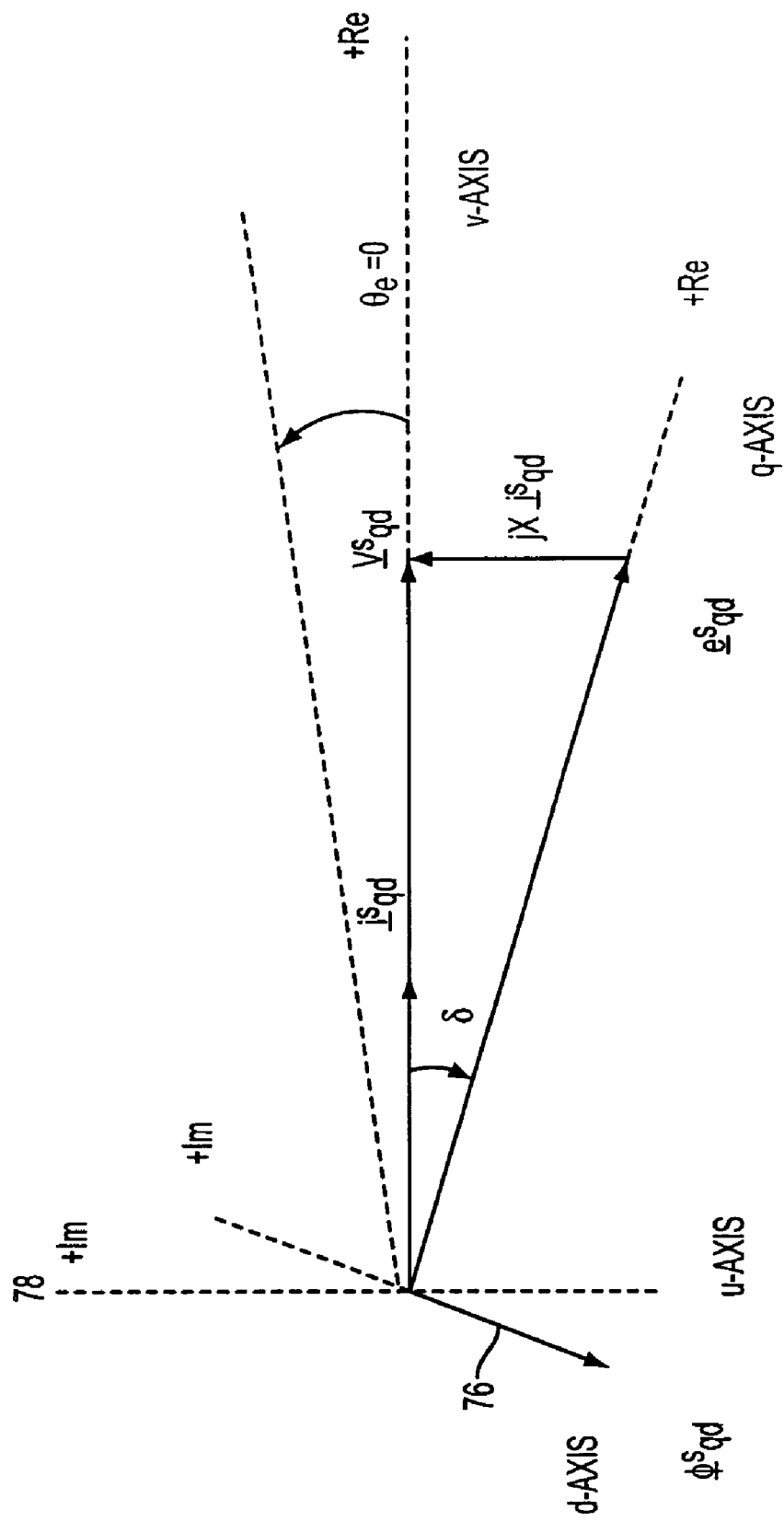
FIG. 7 is a vector diagram illustrating an example of the relationship between reference systems and vector quantities in accordance with an embodiment of the present invention.

FIG. 7 shows a vector diagram illustrating the relationship between the stationary and floating synchronous reference frames. The q-d axis represents the traditional stationary reference frame. The phase currents are represented by a current Park vector that comprises direct and quadrature components $i^s_q$ and $i^s_d$ in the q-d reference frame, and by components $i_v$ and $i_u$ in the floating reference frame. The current Park vector in stationary reference frame is preferably constructed using the measured phase currents $i_a$, $i_b$ and $i_c$ and is represented as:

$$i^s_{qd} = \tfrac{2}{3}(i_a + a i_b + a^2 i_c) = i^s_q - j i^s_d$$

$$i^s_q = \tfrac{2}{3}(i_a - 0.5(i_b + i_c))$$

$$i^s_d = -\tfrac{2}{3} * 0.866 (i_b - i_c)$$

where
$a = e^{j2\pi/3}$ and $a^2 = e^{-j2\pi/3}$

The v-u axis of FIG. 7 represents the floating synchronous reference frame that is aligned with current Park vector in the synchronous machine. A variable angle exists between the v-u axis and the conventional q-d axis. Based on the relationship between the two sets of axis, the following transformation equations are derived: $i_{vu} = i_v - j i_u$, (Current Park Vector in Floating Synchronous Reference Frame)

Current Transformation Equations $$i^s_{qd} = i_{vu} e^{j\theta_{est}} \text{ or } i_{vu} = i^s_{qd} e^{-j\theta_{est}}$$

$$i_v = -i^s_d \sin\theta_{est} + i^s_q \cos\theta_{est}$$

$$i_u = i^s_d \cos\theta_{est} + i^s_q \sin\theta_{est}$$

$$i^s_q = i_u \sin\theta_{est} + i_v \cos\theta_{est}$$

$$i^s_d = i_u \cos\theta_{est} - i_v \sin\theta_{est}$$

Voltage Transformation Equations $$v^s_{qd} = v_{vu} e^{j\theta_{est}} \text{ or } v_{vu} = v^s_{qd} e^{-j\theta_{est}}$$

$$v_v = -v^s_d \sin\theta_{est} + v^s_q \cos\theta_{est}$$

$$v_u = v^s_d \cos\theta_{est} + v^s_q \sin\theta_{est}$$

$$v^s_q = v_u \sin\theta_{est} + v_v \cos\theta_{est}$$

$$v^s_d = v_u \cos\theta_{est} - v_v \sin\theta_{est}$$

The vector cross product of the current Park Vector $i^s_{qd}$ and the unit Park vector $e^{j\theta_{est}}$ of the floating reference frame is compared with zero or a predetermined value. The error between the $i^s_{qd} \times e^{j\theta_{est}}$ and zero value is fed into PI regulator 56. The output of the PI regulator 56 comprises the angular speed estimation value. The position estimation is then obtained by integrating the angular speed. It should be noted that this position information differs from the actual rotor position by an angle between the current and back emf Park vectors. Nonetheless, this position information is gainfully used for the coordinate transformations to achieve a robust sensorless control.

It should be noted that initially an arbitrary synchronous reference frame ($e^{j\theta_{est}}$) is assumed and the control loop forces this initial arbitrary $e^{j\theta_{est}}$ position vector to be in-phase with the current vector via update cycles. That is, with each update cycle, the position vector and current Park vector become more in phase. When this is achieved, the reference system $e^{j\theta_{est}}$ is locked to the current Park vector $i^s_{qd}$ and consequently the u-axis of the current Park vector in floating reference frame becomes zero. The implementation may be performed using either a hardware or software based scheme. This floating reference frame is essentially used for other control loops in the system such as current control loops for the transformation of variables from a synchronous to a stationary frame or vice versa.

FIG. 6 is a circuit diagram using Park vector quantities illustrating an example of a synchronous machine in accordance with an embodiment of the present invention. The synchronous motor has a back EMF Park vector $\underline{e}^s_{qd}$, a stator (synchronous) inductance L, stator resistance R and a terminal voltage Park vector $\underline{v}^s_{qd}$ at its terminals. The equivalent circuit 81 comprises a back EMF Park vector which is $\underline{e}^s_{qd}$ in stationary reference frame, a current Park vector $i^s_{qd}$ in stationary reference frame that is the current flowing through the inductance 84 and resistance R, and a terminal voltage Park vector which is $\underline{v}^s_{qd}$ in stationary reference frame.

FIG. 7 is a vector diagram illustrating an example of the relationship among a voltage Park vector $\underline{v}^s_{qd}$, a backemf Park vector $\underline{e}^s_{qd}$ current Park vector $i^s_{qd}$ and a voltage Park vector $j \, X \, i^s_{qd}$ representing reactance drop in accordance with an embodiment of the present invention. Specifically, FIG. 7 is a vector diagram and shows an example of what occurs when an attempt is made to control the current Park vector of the machine to be in phase with the terminal Park voltage. For simplicity, the voltage drop associated with the resistive drop IR are ignored to simplify the diagram.

The d-axis of stationary reference frame 76 of the synchronous machine is defined by the main flux axis. The q-axis is defined 90 degree leading the d-axis where back EMF Park vector resides. The stationary frame formed by d-and q-axis is fixed in space. The traditional synchronous reference frame is fixed to the flux vector of a synchronous machine, rotating at instantaneous angular speed $\omega = d\theta/dt$. Therefore, Park vectors in traditional synchronous reference frame is obtained by multiplying the Park vectors in stationary reference frame with a unit vector $e^{-j\theta}$ rotating counterclockwise with the synchronous speed where $\theta$ is the angular position of the rotor. This synchronous reference frame is traditionally used to achieve control of the machine when position sensors are used. The floating reference frame, however, does not use rotor position sensors, instead, a reference frame is derived from the current Park vector. Therefore, Park vectors in floating synchronous reference frame is obtained by multiplying the Park vectors in stationary reference frame with a unit vector $e^{-j\theta_{est}}$ rotating counterclockwise with the synchronous speed where $\theta_{est}$ is the angular position of the current Park vector. The floating synchronous reference frame is denoted by v- and u-axis and displaced from the conventional axes of the synchronous reference frame by $\delta$ degrees as shown in FIG. 7.

With the system so far described, current must flow in the windings of the machine in order that a floating synchronous reference frame can be extracted. Under conditions of control initiation while the rotor is spinning, there will typically be no current prior to enabling of the inverter, and as a consequence, excessive current can flow within the inverter/machine, which has the potential for causing overstress of the inverter components. As a consequence, it is desirable to achieve a reference frame that is synchronous with the rotor prior to release of the inverter and associated control system. Referring to FIG. 2 and FIG. 3, prior to current flowing within the machine, the synchronous reference frame can be ascertained from the voltage appearing at the terminals of the machine, the so called back emf. The back emf are represented by a back emf Park vector $\underline{e}^s_{qd}$ that is composed of direct and quadrature components $e^s_q$ and $e^s_d$ in the q-d stationary reference frame, and by components $e_v$ and $e_u$ in the floating reference frame. The back emf Park vector in stationary reference frame is preferably constructed using at least two back emf voltages $e_a$, and $e_b$. $e_c$ is calculated $e_a = -(e_b + e_c)$ and is represented as:

$$\underline{e}^s_{qd} = \tfrac{2}{3}(e_a + ae_b + a^2 e_c) = e^s_q - je^s_d$$

$$e^s_q = \tfrac{2}{3}(e_a - 0.5(e_b + e_c))$$

$$e^s_d = -\tfrac{2}{3} * 0.866(e_b - e_c)$$

where:
$a = e^{j2\pi/3}$ and $a^2 = e^{-j2\pi/3}$

Referring to FIG. 4 and FIG. 5, the addition of a switch capable of changing the input to the FFC from the voltage Park vector computed from the back emf as sensed at the terminal of the machine to the current Park vector representing the current flowing through the machine following enabling of the control system and the associated inverter enables the correct initial conditions on the FFC to be attained prior to enabling of the inverter. Since back emf speed is proportional to the actual speed of the machine with the number of pole pairs, this information is gainfully used to initialize the PI regulator 56 in FIG. 4 and FIG. 5 of the floating reference controller. To further reduce any current transients that would otherwise flow within the inverter/motor, the amplitude of the back emf can be determined from the back emf voltage Park vector, and used as an initial condition for the current regulator, 22, reference FIG. 2 and FIG. 3. Therefore, prior to enabling of the inverter and its control system, the switch, 19, FIG. 4 and FIG. 5, selects the back emf voltage Park vector, and the FFC obtains the speed and angle estimate of the back emf Park vector. At the same time, the magnitude is calculated, and this value used as the initial condition for the current regulator. When the system is commanded to control power, the inverter is enabled, the control system is released, and the switch 40, is commanded to select the current Park vector, producing a smooth transition to an active regulation of current.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A method for controlling a power converter for coupling to a polyphase power line, the method comprising:
   measuring at least two motor phase currents;
   obtaining a floating reference frame for the current Park vector;
   adjusting the reference frame based on an estimated rotor speed; and
   controlling the power converter via the floating reference frame to reinitiate power to a motor while a rotor is still moving.

2. The method of claim 1, wherein the current is sampled periodically.

3. The method of claim 2, wherein for each set of current samples, a current Park vector is determined and the floating reference frame is established.

4. The method of claim 1, further comprising:
   providing a synchronous reference frame by establishing the floating reference frame.

5. The method of claim 1, wherein the step of measuring further comprises:
   using back emf to calculate an initial angle and speed of the back emf Park vector.

6. The method of claim 1, wherein a DC link current is sampled periodically using a DC current sensor.

7. The method of claim 1, further comprising:
   switching from a back emf Park vector to initialize the floating reference frame.

8. The method of claim 1, further comprising:
   initializing and releasing AC current loops and DC current or voltage loops.

9. The method of claim 1, further comprising:
   converting the current Park vector from a stationary frame to a synchronous frame.

10. The method of claim 1, further comprising:
    measuring back emf voltages via voltage sensors;
    calculating the Park vector of the back emf voltage;
    providing the calculated Park vector of the back emf voltage to a floating frame controller; and
    estimating an angle and a frequency of the back emf via the floating frame controller.

11. The method of claim 6, further comprising:
    measuring the dc link current via a dc current sensor;
    calculating a magnitude of the current Park vector and the floating synchronous reference frame; and
    controlling an angle command of the current Park vector in floating reference synchronous reference frame and controlling the magnitude of the current Park vector to adjust a power factor between a terminal voltage and a phase current applied by the power converter.

12. The method of claim 11, wherein the angle command of the AC current Park vector comprises:
    a current error from an adder operated upon by a proportional integrator regulator in the case of a motoring operation; and
    a voltage error from an adder operated upon by a proportional integrator regulator in the case of a generating operation.

13. The method of claim 12, further comprising:
    controlling the angle command and the magnitude of the AC current Park vector to adjust torque output in the case of the motoring operation; and
    controlling the angle command and the magnitude of the AC current Park vector to adjust power output in the case of the generating operation.

14. A method for resynchronizing a synchronous generator during a power interrupt, comprising:
    opening a DC bus main contactor after a converter is powered off;
    measuring back emf voltages via voltage sensors;
    calculating Park vector of the back emf voltage;
    providing the calculated Park vector of the back emf voltage to a floating frame controller; and
    estimating an angle and a frequency of the back emf via the floating frame controller.

15. The method of claim 14, further comprising:
selectively closing the DC bus contactor after power is restored.

16. The method of claim 14, further comprising:
switching from a back emf Park vector to initialize the floating reference frame.

17. The method of claim 16, further comprising:
initializing and releasing AC current loops and DC current or voltage loops.

18. A method for controlling the power factor of a synchronous machine, comprising:
measuring a dc link current via a dc current sensor;
calculating a magnitude of an AC current Park vector and a floating synchronous reference frame; and
controlling an angle command of the AC current Park vector in floating reference synchronous reference frame and controlling the magnitude of the AC current Park vector to adjust a power factor between a terminal voltage and a phase current.

19. The method of claim 18, wherein the angle command of the AC current Park vector comprises:
a current error from an adder operated upon by a proportional integrator regulator in the case of a motoring operation; and
a voltage error from an adder operated upon by a proportional integrator regulator in the case of a generating operation.

20. The method of claim 19, further comprising:
controlling the angle command and the magnitude of the AC current Park vector to adjust torque output in the case of the motoring operation; and
controlling the angle command and the magnitude of the AC current Park vector to adjust power output in the case of the generating operation.

* * * * *